S. R. KENYON.
CORN PICKING AND HUSKING MACHINE.
No. 113,174. Patented Mar. 28, 1871.
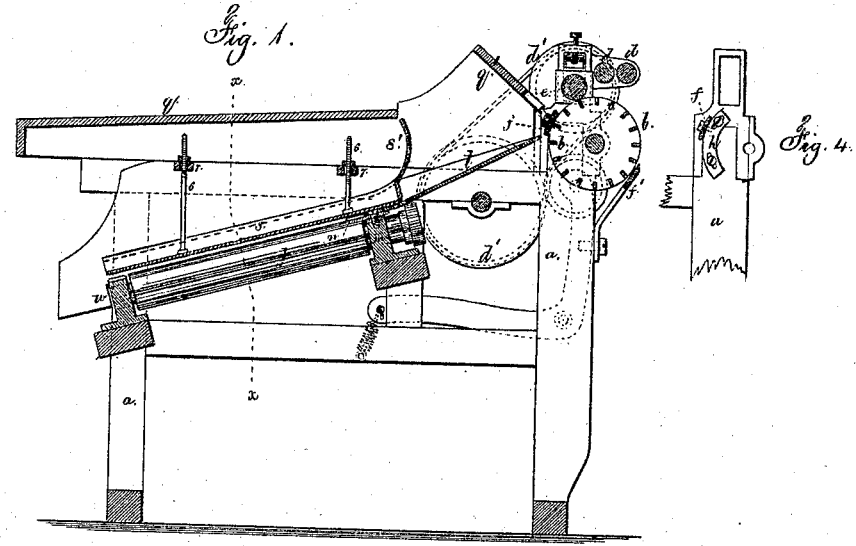
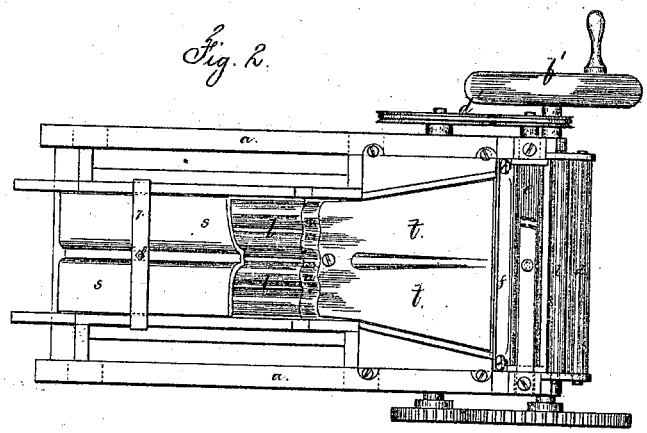
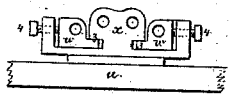
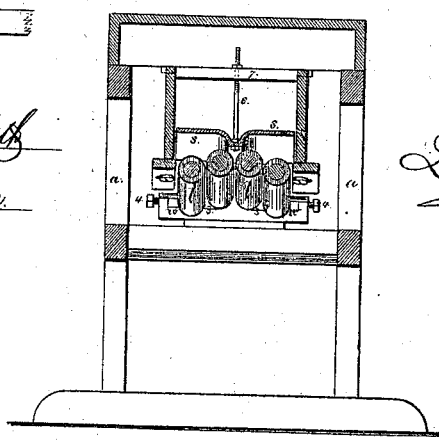

UNITED STATES PATENT OFFICE.

SILAS R. KENYON, OF GREENVILLE, RHODE ISLAND, ASSIGNOR TO HIMSELF AND WILLIAM D. VERNAM, OF ELIZABETH, NEW JERSEY.

IMPROVEMENT IN CORN PICKING AND HUSKING MACHINES.

Specification forming part of Letters Patent No. 113,174, dated March 28, 1871.

*To all whom it may concern:*

Be it known that I, SILAS R. KENYON, of Greenville, in the county of Providence and State of Rhode Island, have invented an Improvement in Corn Picking and Husking Machines; and the following is declared to be a correct description thereof.

Corn-husking machines have been made with inclined husking-rollers, and also with picking-rollers above and at right angles to the husking-rollers.

A movable vibrating plate has also been applied near the picker-roller to prevent the ears passing in between the picker cylinder and roller; but the same is objectionable because the ear lodges against the inclined surface of the picker-plate at such a distance from the point of contact of the cylinder and roller that the stem of the ear is not broken off close to the ear, and sometimes the ear is caught and remains stationary instead of dropping down into the husking-rollers.

My invention is made for the purpose of breaking the stem off closely to the ear without injuring the said ear, and thereby separating the outer or weather-beaten husks from the inner husks and conveying them away from the machine with the stalks. I also construct the machine so that the husks and silk cannot wrap around the journals of the husking-rollers, and I provide a movable cover over the husking-rollers, that is made to form the upper side of the hopper-throat.

In the drawing, Figure 1 is a vertical section longitudinally of the machine. Fig. 2 is a plan with the feeding-table removed, and part of the cover to the husking-rollers also removed, so as to show the ends of the husking-rollers. Fig. 3 is a cross-section of the machine at the line *x x*, Fig. 1. Fig. 4 is a section, showing the picker-plate and its supporting-block; and Fig. 5 is an end view of the boxes for the lower ends of the journals of the husking-rollers.

The frame *a* is of suitable size and shape, and carries the picking-cylinder *b* and other parts of the machine. The picking-cylinder is made with bars or ribs running along its sides, and the journals of this cylinder are supported in suitable boxes, and power is applied to the same by a fly-wheel, *b'*, or otherwise.

Above the cylinder *b* are the rollers *d d* and *e*, the roller *e* being driven by band-wheels *d'* or otherwise, so as to be revolved, and the rollers *d d* may either be free to turn or be also revolved.

The picker-plate *f* is made of a form to set closely to but not touch the picker-cylinder, and it is adjusted in the arc of a circle parallel, or nearly so, to the surface of the cylinder *b*, so as to bring the upper edge of said picker-plate nearer to or farther from the picker-roller *e*, in order that a mouth may be left of a width to admit the passage of the corn-stalks; but the edge of this picker-plate arrests the ear and prevents its being carried against the rollers *d e*; hence the ear will not be injured, and the edge of this picker-plate is so near the point where the stem is nipped and broken upward by the action of the picker-cylinder *b* and roller *e* that the stem of the ear is broken off so close to the ear that the outside husks are carried through with the stalk, and the ear drops down into the husking portion of the machine.

The picker-plate is set at its ends upon segmental bearing-blocks *h*, (shown in detached view, Fig. 4,) that are also adjustable, so that the inner surface of the picker-plate may be brought close to the picker-cylinder. By this construction the machine can be adjusted and adapted to the various characters of corn. The picker-roller is to be set in yielding bearings, the necessary pressure being applied to the same by springs or otherwise.

The stalks of corn are laid upon the table *q*, and fed in between the rollers *b* and *e* and beneath the incline *q'*, and the rollers *d* guide the stalks as they pass out of the machine and bend them down, so that they will be delivered almost straight.

If the plate *f* stood at an inclination, as has before been the case, the ear would take against its inclined surface and wedge between that and the roller *e*; but, in consequence of the picker-plate *f* standing so that the ear takes against its upper edge, this difficulty is avoided, and the ear is broken off short and drops into the hopper.

The husking-rollers $l$ are arranged in one or two pairs, set at an inclination, and they are mounted in journals and revolved by gearing in a manner similar to that shown in Letters Patent granted to me August 27, 1867.

The upper parts of the journal-boxes $m$ are provided with a projecting shield, $n$, running over the upper ends of the rollers $l$, so as to prevent the fibers or husks winding around the journals of the rollers $l\,l$; and the journal-boxes $w$ have projections at their inner ends, passing beneath the projecting lips 3 of the stationary boxes $x$, so as to hold down their inner ends, and the screws 4 serve to adjust the pressure that keeps the rollers in contact. I prefer to have these rollers $l$ of india-rubber.

The incline $t$ conducts the ears from the picking to the husking portion of the machine, and a cover, $s$, is provided above the husking-rollers to prevent the ears of corn assuming a vertical position in consequence of the rollers grasping the husks at the ends of the ears.

The cover is made with a curved upward inclination, $s'$, at the upper end, forming, with the incline $t$, a mouth for receiving the ears, and this cover is sustained by the screws-rods 6, that pass through the cross-bars 7. Adjusting nuts or screws are provided, so that the cover can be raised or lowered to adapt the machine to different qualities of corn.

The cover $s$, the suspending-rods 6, and the cross-bars 7 can be lifted out of the machine whenever access is required to the husking-rollers. This cover is preferably made of cast-iron, so as to be properly shaped at the receiving end, in the manner shown. By having this cover made as a compound curve, the ears are guided into a space that gradually becomes narrower, so that the ear cannot turn upon end when seized by the husking-rollers, but passes gradually down the inclined rollers until entirely deprived of husk.

Husking-machines have been made with an inclined end to the cover, and beneath this the ears have passed; but this inclined end was in such a position to the conductor and husking-rollers that the rollers, seizing the ends of the husk before the ear was beneath the cover, turned said ear up endwise and held it in that position and obstructed the action of the machine.

By forming the cover as a curved incline, extending above the conductor in the manner shown, this difficulty is avoided, because the ear cannot turn up endwise as the husk is seized by the rollers in consequence of the ear coming against the under side of that portion of the cover $s$ that is partially above the conductor $t$, thereby keeping the ear down in such a manner that it is obliged to pass down the rollers upon its side. A knife, $f'$, is applied below the picker-cylinder, to clear from the same any leaves that may wind around it. This knife or bar is adjustable by slots and screws.

I claim as my invention—

1. The picker-plate $f$, made adjustable in the arc of a circle, parallel, or nearly so, to the picker-cylinder $b$, in combination with said cylinder $b$ and roller $e$, substantially as and for she purposes set forth.

2. In combination with the husking-rollers $l$, the caps $n$ of the journal-boxes $m$, when said caps are made to extend over the upper ends of said rollers, as described and shown, and for the purposes specified.

3. In combination with the husking-rollers $l$ and inclined conductor $t$, the cover $s$, provided with the curved end $s'$, when arranged in relation to said conductor as shown, and for the purpose described and set forth.

4. The cover $s$, formed with a curved inclination, $s'$, at the receiving end, in combination with the adjustable suspending-rods 6 and cross bar or bars 7, substantially as and for the purposes set forth.

Signed this 24th day of January, A. D. 1871.

SILAS R. KENYON.

Witnesses:
CHAS H. SMITH,
GEO. T. PINCKNEY.